United States Patent [19]
Vankouwenberg et al.

[11] Patent Number: 5,582,680
[45] Date of Patent: Dec. 10, 1996

[54] WASTEWATER TREATING APPARATUS

[75] Inventors: Raymond E. Vankouwenberg, 6709 Lake Ave., Williamson, N.Y. 14589; Robert D. Gendreau, Honeoye, N.Y.

[73] Assignee: Raymond E. Vankouwenberg, Williamson, N.Y.

[21] Appl. No.: 347,052

[22] Filed: Nov. 30, 1994

[51] Int. Cl.⁶ .................... B01D 1/30; C02F 1/04
[52] U.S. Cl. ............ 159/23; 110/235; 110/238; 110/248; 159/34; 159/42; 159/44; 159/47.3; 159/DIG. 32; 159/DIG. 40; 159/DIG. 41; 202/83; 202/206; 202/235; 203/1; 203/10; 203/100
[58] Field of Search ................ 159/22, 23, 34, 159/40, 42, 44, DIG. 40, 47.3, DIG. 41, DIG. 32, DIG. 35; 110/238, 235, 248; 203/1, 10, 100; 202/206, 160, 83, 235

[56] References Cited

U.S. PATENT DOCUMENTS

| | | | |
|---|---|---|---|
| 4,303,122 | 12/1981 | Powell | 165/39 |
| 4,437,968 | 3/1984 | Elliot, Jr. | 159/23 |
| 4,484,530 | 11/1984 | Goetzman | 110/248 |
| 4,600,474 | 7/1986 | Korenowski | 159/38 |
| 4,796,602 | 1/1989 | Atkinson et al. | 159/38 |
| 5,062,372 | 11/1991 | Ritter | 110/235 |
| 5,082,525 | 1/1992 | Travis | 202/182 |
| 5,191,846 | 3/1993 | Clay | 110/235 |
| 5,291,840 | 3/1994 | Nakao | 110/235 |
| 5,295,448 | 3/1994 | Vickery | 110/235 |

Primary Examiner—Virginia Manoharan
Attorney, Agent, or Firm—Jaeckle, Fleischmann & Mugel

[57] ABSTRACT

A compact, transportable and self-contained apparatus for treating wastewater containing as impurities and pollutants various non-volatile (at water boiling points) fluids such as greases, oils and soaps, having a vessel/evaporator for receiving the wastewater, a heater below the evaporator to heat the wastewater admixture and boil off the water, a collector to draw off the non-volatile fluids from substantially the entire height of the water evaporator, and automatic refill/shutdown control devices for the apparatus.

25 Claims, 3 Drawing Sheets

WASTEWATER TREATING APPARATUS

FIELD OF THE INVENTION

A wastewater cleaning apparatus that reduces the volume of wastewater required for disposal by an efficient water evaporation and oil/waste residue collection design.

BACKGROUND OF THE INVENTION

Good manufacturing processes, concern for the environment, and changes in environmental practices and regulations all have created additional needs in handling waste fluids after manufacturing and cleaning operations, especially in disposing of water based mixtures containing pollutants such as greases, oils, soaps, heavy metals, road film and carcinogens. Whereas in the past it was acceptable merely to dump such waste liquids in the ground or in sewer systems, current manufacturing practices and environmental laws and regulations now severely discourage and/or prohibit such practices. Although very laudable in intent, the result can be very costly especially to small manufacturers and to business operators who must use substantial quantities of water in their operations, as for example to clean and degrease manufactured parts such as metal products and the cleaning and maintenance of vehicles and other machines that by their nature will shed greases and oils and often detergents and road film with the wastewater. Larger manufacturers and large fleet operators presumably have the resources and efficiencies of scale to incorporate expensive water treatment facilities into their operations, but smaller operators historically have been limited to standard disposal techniques as by third-party hauling of large volumes of wastewater to third-party treatment sites, which whether privately or municipality owned are quite expensive both in the hauling and treatment costs. Even larger companies cannot justify large treatment facilities at their satellite locations and smaller division sites, or at their distribution, repair and wash centers where smaller fleets and/or fewer parts/equipment cleaning operations take place.

Biodegradable soaps and detergents of course are common, but their use does not suffice for the many thousands of equipment wash sites throughout the country, from which road film, greases, oil, heavy metals and carcinogens may be collected or emulsified in the wash water. The result can be contaminated ground and ground water, delayed work orders, reduced land values, and possible regulatory violations or else very expensive cleanup costs and substantial manifest and transpiration costs to remove the waste water.

Attempts have been made to reduce the costs and/or the volume of waste fluids requiring hauling and remote treatment/disposal. Examples include the "Water Eater" marketed by the Equipment Manufacturing Corporation of South El Monte, Calif., which is a self contained unit that uses electrical or gas heat to evaporate the water into the atmosphere while using a swivel tube to collect the non-volatile liquids such as oil that remain on the surface of the residual liquid in the container as the water is boiled off. Two other self contained water evaporator systems include the "Samsco" Water Evaporator (U.S. Pat. No. 5,082,525) that heats the liquid mixture by a serpentine gas-fired heat exchanger, and the free oils and the oils from the thermally broken emulsions are caused to float to the surface to be skimmed and precipitated solids settling to the bottom to be removed through a clean-out port, and the "Water Blaze" Evaporation System by Landa, Inc. of Portland, Oreg., which applies a flame directly to the wastewater stream as it is pumped into the unit.

The above described prior art seem to provide working wastewater treatment methods using evaporation techniques, but they also are complex in construction, lack transportability or may not be as efficient. For example, the gas flame of the Samsco unit is applied to a heat exchanger submersed in the water tank, which because of alkaline or acidic conditions of the water can cause serious damage to the equipment In the case of the Landa unit, the heat applied directly to the wastewater stream can, because of its temperature, cause even some of the contaminants in the water to be volatized. We have invented an alternate system also on the evaporation principle, but which is easy and relatively inexpensive to manufacture with readily available materials and components, simple and safe to operate, and relatively more efficient in the active removal of non-volatile fluids and other contaminants, thereby reducing initial costs as well as reduction in both treatment costs and working equipment down times. Moreover, none of the prior art as known by applicant readily lends itself to field use where natural gas or high voltage power lines often are not available.

It is therefore an object of this invention to provide an apparatus for treating wastewater by evaporation and recovery of substantially reduced volumes of non-volatile waste fluids and other contaminants.

It is another object of this invention to provide an apparatus for treating wastewater by evaporation and recovery of non-volatile fluids and other contaminants which is compact and transportable for field use using convenient and flexible fuel and energy sources.

Another object of this invention is to provide an apparatus for treating wastewater that is very efficient and has space saving dimensions.

It is yet another object of this invention to provide an apparatus for treating wastewater by evaporation and recovery of non-volatile fluids and other contaminants using conventionally available materials and components that are easy and safe to operate.

SUMMARY OF THE INVENTION

In accordance with this invention, there is provided a compact, self-contained and transportable apparatus for treating wastewater containing, as impurities and pollutants, various non-volatile (at water boiling points) fluids such as greases, oils, road films, carcinogens and detergents, reservoir means for collecting the wastewater with automatic shut-off protection at high and low fluid levels, heating means to heat the wastewater admixture to boil off the water, collection means to draw off the non-volatile fluids from substantially the entire height of the water reservoir during operation of the apparatus, and automatic refill/shutdown of the apparatus.

BRIEF DESCRIPTION OF THE DRAWINGS

The present invention will be more fully understood by reference to the following detailed description thereof and the attached drawings, in which like reference numerals refer to like elements, and wherein.

DESCRIPTION OF THE PREFERRED EMBODIMENT

Figure 1:
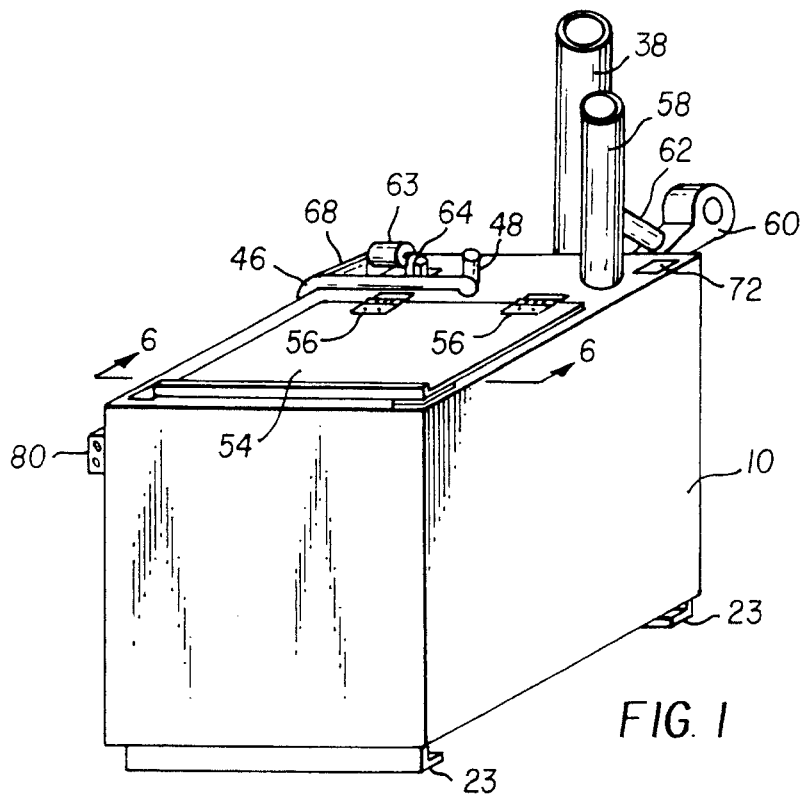
FIG. 1 is an isometric view of the preferred embodiment of this invention, showing the front, right and top sides of the apparatus.

Referring to FIG. 1, a preferred embodiment of the present invention comprises an external jacket 10 comprising at least the four vertical sides and portions of the bottom side of the apparatus. Jacket 10 is substantially cubic in shape (32"×32"×34½" high) and constructed of sheet metal, preferably a 12-gauge galvanized carbon steel. Inside jacket 10 and spaced approximately one inch from jacket 10 is a flue chamber 11 to contain and direct heating gases and made of heat resistant sheet material, preferably a 16-gauge galvanized carbon steel. Inside the flue chamber 11 is contained a fluid receiving vessel 12 preferably made of 12-gauge stainless steel the sides of which are about 1½ inches from the sides of the flue chamber 11. Vessel 12 also acts as an evaporator for the fluid as will be described. Below the flue chamber 11 and fluid vessel 12 and centered within the external jacket 10 is a fire box 14 of 12-gauge carbon steel that is open at the top and measures about 9" high by 25" front-to-back and 21" side-to-side.

Figure 6:
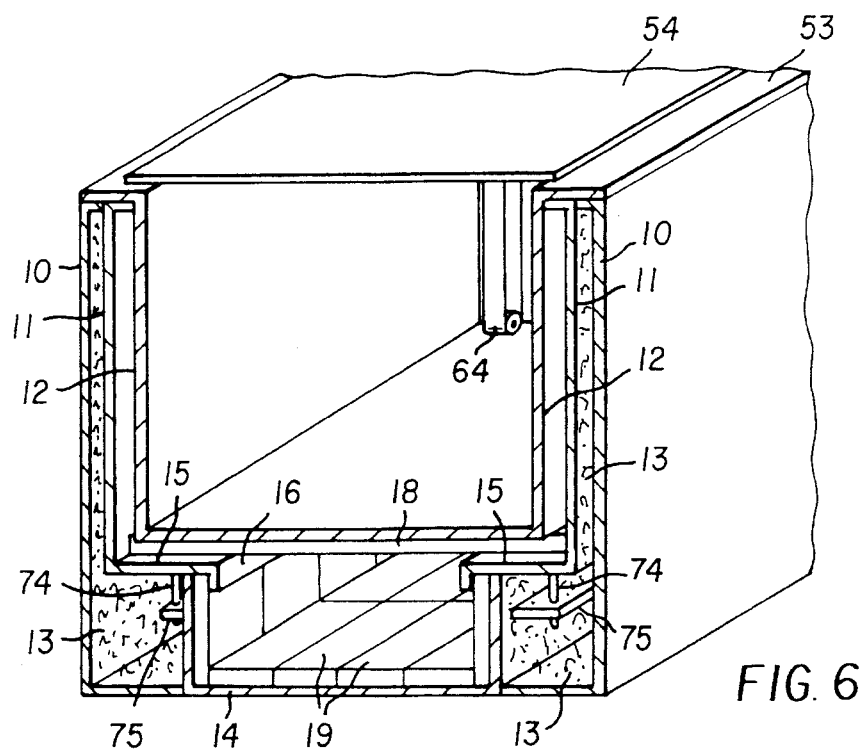
FIG. 6 is a partial sectional view of the apparatus taken on line 6—6 of FIG. 1.

As seen in FIG. 6, the bottom side 15 of the flue chamber 11 is open in the center and the inside edges of which are turned in on all four sides to overlap the four top edges of the fire box 14 and again turned down at 16 inside the fire box 14 a sufficient amount to retain the top ends of standard fire brick 19 of 9×4½' 1½ inches that are placed on end about all four sides of the fire box 14 and laid flat along the bottom inside surface of the fire box 14. If necessary, there are vertically placed at the four inside vertical corners of the fire box 14 square metal tubing (not shown) of the same thickness as the fire brick to ensure complete coverage and secure the positioning of the fire brick 19. Welded to the bottom surface of the fluid vessel 12 and from side-to-side of the vessel 12 by their narrower sides are preferably six evenly spaced ¼×1¼" heat flow directing bars 18 of hot rolled steel to both support and improve even heat transfer to the fluid vessel 12. By each of the heat flow directing bars 18 extending to the inside side surfaces of the flue chamber 11 (see FIG. 6), the bars 18 reduce turbulence of the flue gases as they escape from the fire box 14 around the inside of the bottom surfaces 15 of the flue chamber and up the sides of the apparatus between the flue chamber 11 and the fluid vessel 12 to the flue gas exhaust hole 17 cut as shown in the back of the flue chamber 11.

Although not illustrated all figures of in the drawing, primarily for simplicity of illustration, there is provided as shown in FIG. 6 between the outer jacket 10 and the flue chamber 11 a one-inch thick blanket of fiberglass insulation 13. Fiberglass insulation 13 is also packed below the flue chamber 11 between the outer jacket 10 and the fire box 14.

Figure 4:
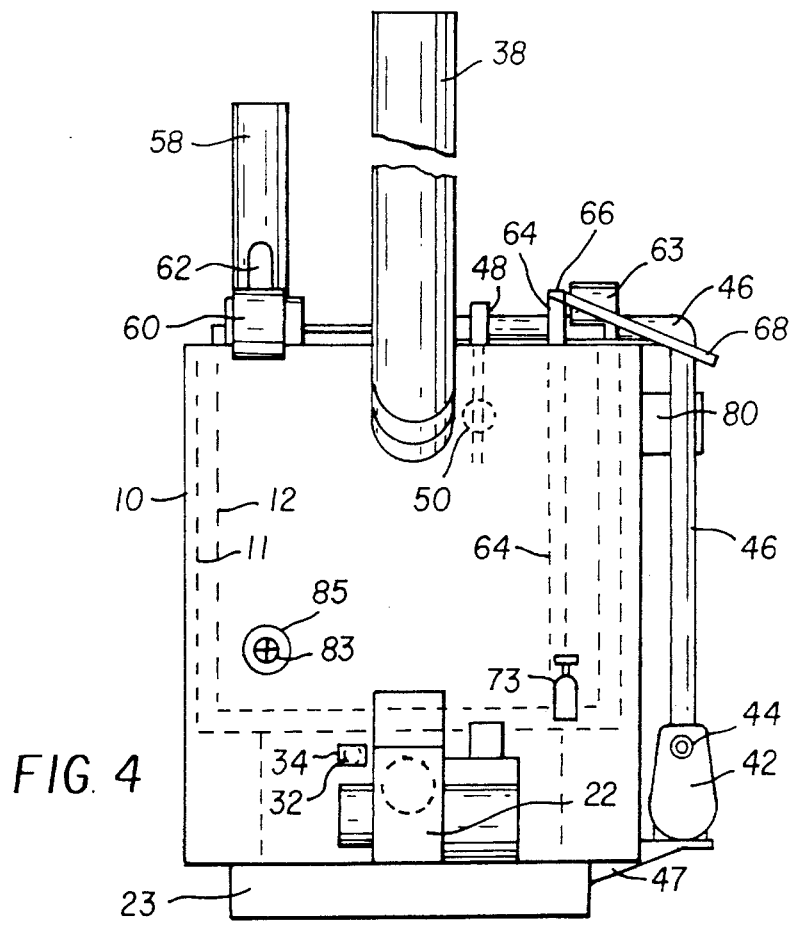
FIGS. 4 and 5 are, respectively, the left side and rear views of the embodiment of FIG. 1.
Figure 5:
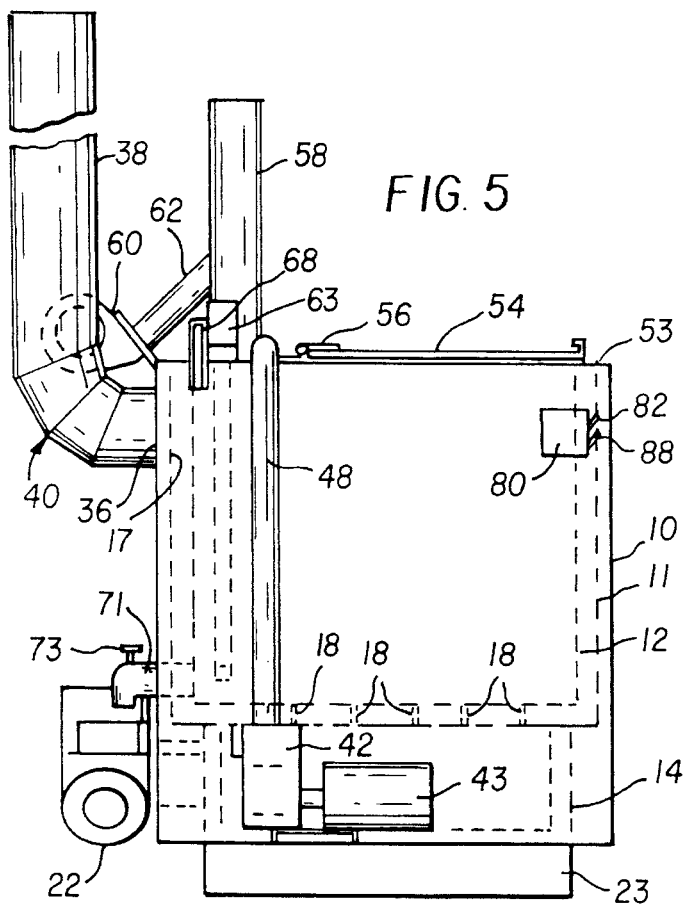

At the rear end of the outer jacket 10 and the fire box 14 are aligned 4½" diameter openings 20 to receive the nozzle end of an oil or kerosene burner 22. At one end of the outer jacket 10 is a conventional adapter mounting plate (not illustrated) with mounting holes capable of receiving any one of several standard burner/heating units of kerosene, heating oil or propane gas, schematically represented as shown in FIGS. 4 and 5. Suitable such mounting plates and burners 22 include the CF500/CF800 pressure firing mounting flange kit and the 800AFG Oil Burner supplied by R. W. Beckett Corporation of Elyria, Ohio (1994 Catalog). The 800AFG Oil Burner has an air turbo injector and high efficiency blower wheel for high static pressure firing, using between about 0.4 to about 3.0 gph of kerosene or diesel oil with normal operation for use with this invention of about 2.0 gph, a shielded transformer ignition system and a manual reset overload protection with a 3450 rpm operating motor. Other possible burners are the "Blue Angel" High Efficiency (Stock #2E747/8) and "Eagle One" Flame Retention oil burners (Stock #2E960/1/2/3), the latter two of which are supplied by W. W. Grainger Company of North Suburban, Ill. under their General Catalog No. 379. Adjacent to the burner 22 is a viewing hole 32 with a sliding or pivoting cover 34 and open to the inside of fire box 14 to inspect for possible adjustment the flame of the burner 22. At back of the outer jacket 10 and centered about four inches below the top surface 53 of the apparatus is a six inch diameter opening 36 to receive a sheet metal smoke flue or duct 38 with a bi-sectioned ninety degree bend at 40 extending to the exhaust opening 17 of the flue chamber 11 and a vertical height of about ten feet more or less depending on apparatus location, air currents and local safety regulations.

In the preferred embodiment shown, the burner 22 uses diesel oil or kerosene because of price and ready availability for field use and safety in open air operations, but burners that use liquid petroleum or propane could also be used. Although not illustrated with the burner 22, the oil or kerosene is supplied from a typical fuel tank or portable fuel can by conventional and well known flexible piping means.

Supporting the entire apparatus are three U-channels 23 (three-inch 4.1 lb. rolled steel channel iron) welded at their top sides as shown. The right side of the apparatus base as shown in FIG. 1 is left open so that the apparatus may be transported by means of a fork lift truck.

At the left side of the apparatus is a fluid pump 42 powered by an electrical motor 43 and by which the water vessel 12 is filled with the wastewater through an inlet 44 from a remote source (not shown) such as a portable collecting pool in which equipment is placed for maintenance or cleaning or from a standing collecting tank. It is preferable according to the invention that the pump be self-priming to be able to draw water from any standing source. As will be described, the pump 42 is actuated either manually or automatically by control switches. The pump 42 delivers the wastewater to the fluid vessel 12 by means of the fill pipe 46 at the pump side and top of the apparatus and preferably is self priming to be able to draw waste fluids from any collection source. An appropriate fluid pump for this invention comprises the "Teel" 1" self-priming centrifugal pump with ½ HP, 3450 RPM motor and stainless steel shaft (Stock No. 2P390 from W. W. Grainger General Catalog No. 379) which for 1-inch diameter fluid lines will handle up to about 2200 gph of wastewater and other nonflammable liquids even with sediment and some minor size solids such as metal shavings, grit and sand.

The pump 42/motor 43 unit is supported by a bracket 47 detachably bolted to the left side U-channel 23 so that the pump/motor can be removed for transportation and inventory. Although not shown, fill pipe 46 includes corresponding union joints at the top of the apparatus and at the pump also for removal during transportation and stocking.

Figure 2:
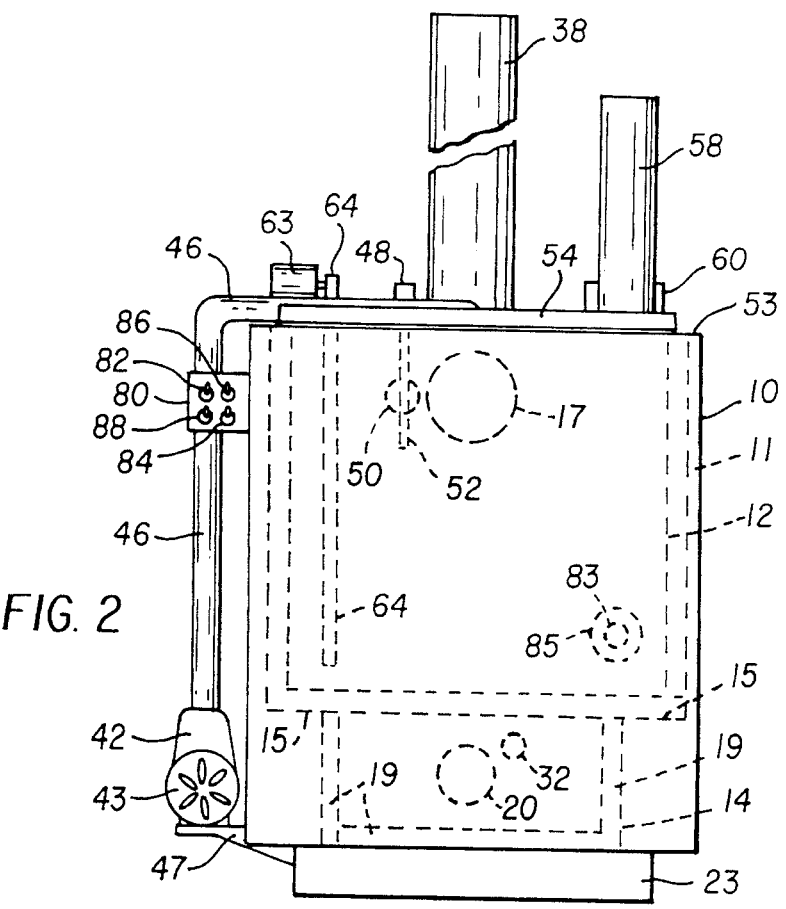
FIG. 2 is a front view of the embodiment of FIG. 1.
Figure 3:
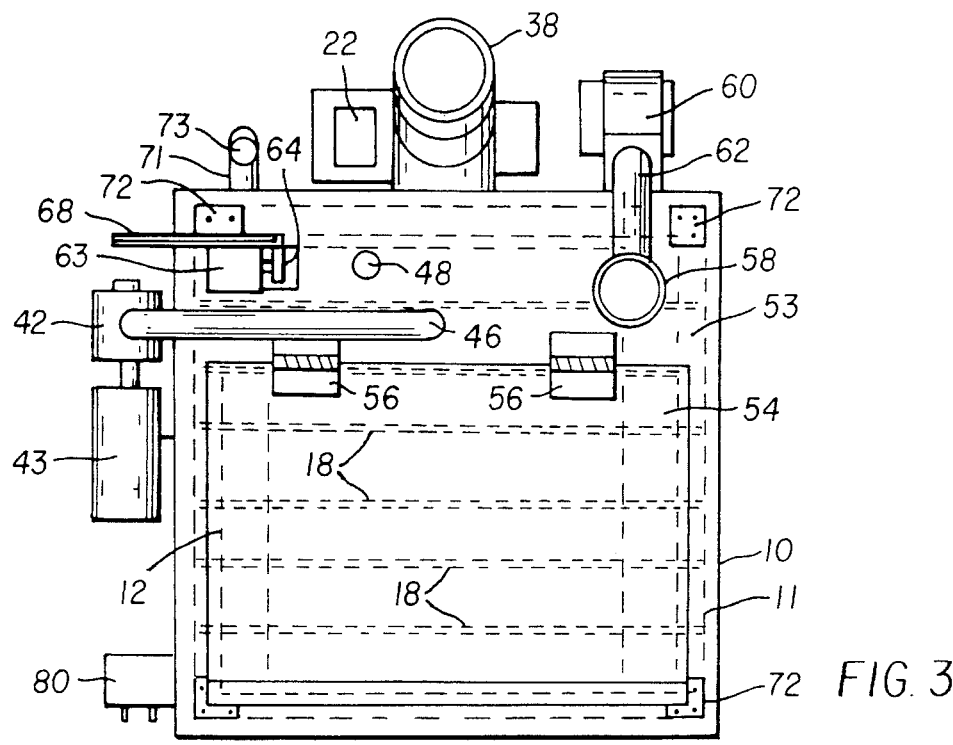
FIG. 3 is a top view of the embodiment of FIG. 1.

Within the vessel 12 and mounted from the top surface 53 of the apparatus is a fluid level control device 48 that has both upper and lower switch limits to alternately actuate and shut off the pump 42 at predetermined low and high water levels. At the predetermined low water level, the control device 48 may, if additional wastewater is to be treated, reactivate the wastewater filling pump 42 to maintain the water level between the high and low points as illustrated by the dotted line indices next to a spherical float 50 in FIG. 2. We have found that optimum operation of the apparatus is achieved by maintaining a nominal wastewater level of about five inches below the top 53 of the fluid vessel 12 and the upper and lower limits of the pump operating switch 48 set for about one inch above and one inch below the nominal height. In this manner, heat from the fluid gases can be transferred to the fluid vessel 12 and contained wastewater throughout its height and thus increase significantly operating efficiency. A suitable control device 48 that works well in this invention is the reed-style liquid control switch No. 4646K51 (supplied by McMaster-Carr Supply Company of New Brunswick, N.J. in their Catalog#98). The fluid level control device 48 comprises lead wires 52 and the 2⅛ inch diameter stainless steel float 50 containing a hermetically sealed reed switch activated by a permanent magnet in the float to control the pump 42 at the preset high and low fluid levels. If desired, although not shown in FIG. 2 but schematically illustrated at 55 in FIG. 7, there may be provided as another safety device a further such control switch of the same type as control switch 48 mounted at the bottom of the fluid vessel 12, say about two inches up from the bottom of vessel 12, to open all of the electrical circuits to the burner 22 and pump motor 43, as well as the circuits to a fan and skimmer to be described, if there is insufficient wastewater to continue safe operation of the apparatus.

At the top 53 of the water vessel 12 is a cover 54 hinged at the top of the apparatus as shown at 56, as well as a four inch steam discharge pipe 58 at one corner of the vessel 12. To facilitate and maintain steam discharge is an air blower 60 the exhaust end of which is connected to the discharge pipe 58 by a two inch diameter air flow pipe 62 welded to the discharge pipe at a forty five degree angle. A suitable blower is supplied by W. W. Grainger under its stock No. 4C442 in its General Catalog 379. The cover 54 is spaced from the apparatus top 53 by spacers of about ¼ inch thickness encourage vapor flow by the blower 60 by drawing in outside air and thus reduce the possibility of a vacuum being created within the fluid vessel 12 as water is evaporated.

If desired, or if necessary because of local environmental regulations, the evaporating discharge pipe 58 can be connected to a conventional water condenser coil (not shown) to collect distilled water for reclaiming and reuse, as for example a water supply at an equipment or vehicle washing site.

At the opposite rear side from the discharge pipe 58 is an oil belt skimmer 64 mounted to the top 53 and extending to the bottom of the water chamber 14 with only sufficient clearance to ensure continuous operation and to occasionally scrape clean any residue at the bottom of the vessel 12 through the top opening. The oil skimmer 64 in itself is a known device, and is available from companies such as Wayne Products, Inc. of Frazer, Pa., ("Mini-Skimmer" Model MSB and #600 stainless steel single flat belt) advertised to remove oil from standing barrels and the like. We have discovered that this oil skimmer has a very desirable use in this invention to more efficiently collect the non-volatile fluids such as oils from heated water. The belt 66 of the skimmer attracts and holds such fluids as the belt 66 moves through the boiling temperature water and is removed from the belt 66 above the fluid tank 14 by a wiper blade 68 with one edge riding against the outer surface of belt 66, the oil to then be directed from blade 68 to a trough 70 for collection in a container (not shown).

At the back of the fluid vessel 12 adjacent the bottom surface is a two inch internal diameter discharge pipe 71 open to the vessel with a two-inch gate valve 73 outside the outer jacket 10 as shown to remove the balance of unevaporated fluids and the sediment and other contaminants remaining after operation. The result is a vastly reduced volume of waste matter requiring disposal.

The corners of the top 53 each contain a cover plate 72 removably mounted by bolts or the like to permit access to the spaces between the water vessel 12 and the flue chamber 11 for occasional routine cleaning. In addition, for occasional cleaning of the fire box 14 and cleaning or replacement of firebrick 19, at least three alignment rods 74 are welded to the bottom sides 15 of flue chamber 11 as shown in FIG. 6, which are removably mounted in corresponding holes in retaining bars 75 welded to the sides of fire box 14 also as shown. As the upper edges of outer jacket 10 are not fixed to top 53, and correspondingly the top edges of fire box 14 are not fixed to the bottom sides 15 of flue chamber 11 or the bars 18, both the flue chamber 11 and the fluid vessel 12 rest by gravity on the outer jacket 10 and may be retained in place by several sheet metal screws around the periphery of top 53. The flue chamber 11 and fluid vessel 12 may then be removed to provide complete access to the fire box 14 and the fiberglass insulation lining inside the outer jacket 10.

Figure 7:
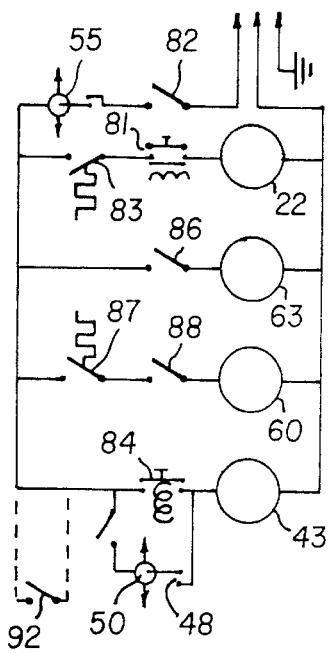
FIG. 7 is a schematic of the electrical circuit of the preferred embodiment.

Mounted at the left side of the apparatus is a multiple switch box 80 containing four switches 82, 84, 86 and 88. The first switch 82 is a master switch to activate the electrical circuitry and for quick shut-down. The second switch 84 is a "dead-man" switch to operate the water pump motor 43 especially when there is no regular wastewater collection tank. Switch 84 is closed only while positive pressure is applied to it. The third switch 86 activates the belt skimmer 64, and the fourth switch 88 activates the blower fan 60. Each of the switches 82, 84, 86 and 88 is connected to their respective units by the circuitry shown in FIG. 7. As can be seen in FIG. 7, the pump motor 43 is controlled both by the "dead man" switch 82 at the control box 80 and, if desired, by a remote switch 92 at the wastewater supply tank (not shown), so the pump will operate only when both switches 82 and 92 are closed. As can also be seen in FIG. 7, the "dead man" switch can be by-passed for automatic continuous operation by activation of the water level control reed switch 48.

Located at the rear of the apparatus and mounted against the outside wall of the flue chamber 11 is a thermally activated switch or temperature probe 83 accessed through an opening in jacket 10 through hole 85. This switch 83 is connected in series with burner 22 in order to shut off power to the burner 22 if the temperature of the flue chamber 11 reaches a preset limit, say 230 degrees Fahrenheit, which will occur when the wastewater level approaches the bottom of vessel 12. Switch 83 suitably is a thermally sensitive switch such as the Therm-o-disc Model No. 74T11-310712 supplied by companies such as W. W. Grainger under their stock No. 4E120 in their Catalog No. 385. This switch is an adjustable bi-metal snap disc control and has a variable setting from 210–250 degrees Fahrenheit and opening on the rise of temperature to be able to vary the fuel cut-off operating temperature. FIG. 7 also illustrates the manual burner overload reset switch 81 which is contained within and supplied by the manufacturer with burner 22 and must be manually depressed each time the burner 22 is to be fired up.

Although not otherwise illustrated, FIG. 7 shows an additional, optional thermally activated switch 87 mounted in the vessel 12 in series with the motor of blower 60 and set to close at a temperature of, say, 170 degrees to delay operation of the blower until the wastewater approaches its boiling point. Such a switch may be the Therm-o-disc Model No. 74T 12-310709 also supplied by companies such as W. W. Grainger under their stock No. 4E117 in their Catalog No. 385. This switch, also an adjustable bi-metal snap disc control, has a variable setting from 140–180 degrees Fahrenheit and closing on the rise of temperature to be able to vary the blower operating temperature.

As shown in FIG. 7, power is applied through a three-line electrical wire connecting the apparatus to a 110 volt AC 20-amp power source and the various electrical components as shown in FIG. 7. Although not otherwise illustrated in the remaining figures, the electrical circuit as shown in FIG. 7 is easily understood by those skilled in the art and can be suitably and safely wired in the apparatus by any competent heating/ventilation/air conditioning (HVAC) technician.

In operation, the apparatus is first turned on by closing master switch 84, and if the apparatus is to be filled manually by holding the pump motor switch 84 closed until the wastewater supply (not shown) is drained or the fluid level reaches the top of the vessel 12 at a suitable height, and the pump then turned off by releasing the switch 84. Vessel 12 is then caused to function as an evaportaor by firing up burner 22 to cause the wastewater to reach its boiling temperature and evaporate the water. The skimmer 63 is activated by closing switch 86, and oil/grease is carried by the skimmer belt 64 to the top of the apparatus where it is removed by wiper blade 66 to be discharged by tube 68 to a suitable collecting container. The blower 60 is then turned on by switch 88 to facilitate steam discharge. When the wastewater reaches its lowest operating level, the burner is cut off by the thermally activated burner control switch 83, or the pump is reactivated to fill the chamber again. For continuous operation, a switch at the top of fluid level control 48 activates the control to continue supplying wastewater until the remote supply switch 92 is opened or the burner control switch 83 cuts off the burner. Alternatively and preferably for continuous operation, if a low water level switch similar to switch 48 is used as at 55, the entire apparatus is shut down when that switch 55 is opened because no further wastewater is present in the vessel 22 or cannot be supplied by the wastewater collecting station.

As a test, a pint of oil to which a red colorant was added, was mixed with a full vessel 12 of water of about 85 gallons. After about 45 minutes, the chamber was drained and nearly the entire amount of oil was recovered in the collector as opposed to a substantial portion settling on the bottom and requiring hand cleaning or at least larger volumes of fluids to be disposed of in an environmentally safe manner. The result is an efficient and compact apparatus operating for only pennies per gallon of wastewater.

It is to be understood that the aforementioned description is illustrative only and that changes can be made in the apparatus, in its components and their functions, and in the sequence of combinations and process steps, as well as in other aspects of the invention discussed herein, without departing from the scope of the invention as defined in the following claims.

We claim:

1. A compact, transportable self-contained apparatus for treating wastewater containing a substantial volume of water and substantially lesser amounts of, at water boiling points, non-volatile contaminants the apparatus comprising (a) a fluid evaporator to collect wastewater, the fluid evaporator having a bottom, at least a partially open top and at least vertical two side walls and a back wall;

(b) pump means for delivering wastewater to the fluid evaporator;

(c) a fire box underneath the fluid evaporator and having an open top, (d) a flue chamber surrounding at least the side walls and the back wall of the fluid evaporator and spaced from the walls of the fluid evaporator defining an air space entirely outside the fluid evaporator, the flue chamber having a bottom open to the open top of the fire box;

(e) burner means for producing a flame in the fire box to heat air in the interior of the fire box;

(f) means for directing air heated by the flame from within the fire box through the flue chamber and through the air space and outside of the fluid evaporator to heat the fluid evaporator walls, the burner means providing sufficient heated air to heat the bottom, side walls and back wall of the fluid evaporator to cause wastewater in the fluid evaporator to reach the boiling point of water and evaporate the contained water into water vapor, (g) vapor for exhaust means for expelling the water vapor from the fluid evaporator;

(h) means for exhausting the heated air substantially entirely separate from the expelling water vapor; and (i) collection means for withdrawing the contaminants and any unevaporated water from the fluid evaporator, the collection means including a continuous belt skimmer having a continuous elongate belt loop to which the contaminants in the water can adhere and extending substantially vertically along the entire height of the fluid evaporator, drive means for rotating the belt loop through the wastewater, and means outside the fluid evaporator for moving and collecting the adhered contaminants from the belt loop.

2. The apparatus as recited in claim 1, and further comprising an outer jacket surrounding and spaced from the flue chamber, and insulating means contained within the space between the outer jacket and the flue chamber.

3. The apparatus as recited in claim 1, wherein the pump means includes wastewater level control means for maintaining the wastewater at a predetermined level near at least partially the open top of the fluid evaporator, and further comprising means for deactivating at least the burner means when during evaporation the wastewater in the fluid evaporator reaches a predetermined low point.

4. The apparatus as recited in claim 3, wherein the deactivating means comprises a thermal control mounted against an outside surface of one of the walls of the fluid evaporator to deactivate at least the burner means when the fluid evaporator wall reaches a temperature of about 230° F.

5. The apparatus as recited in claim 3, wherein the waste water level control means comprises a float control mounted inside the fluid evaporator near the bottom of the fluid evaporator to reactivate the pump means when the wastewater in the fluid evaporator reaches the predetermined low point.

6. The apparatus as recited in claim 1, wherein the fire box includes a bottom wall and at least three vertical side walls, the apparatus further comprising fire brick that lines the interior of the fire box at the bottom and side walls, and the bottom of the flue chamber having means for retaining the fire brick that lines the side walls of the fire box.

7. The apparatus as recited in claim 6, and further comprising means for detachably mounting the flue chamber and fluid evaporator to the fire box for removal and ready access to the fire box for cleaning and maintenance, in which the means for detachably mounting the flue chamber and fluid evaporator comprises at least one alignment rod mounted on one of the flue chamber and fire box and means defining a hole in the other of the flue chamber and fire box to detachably receive the alignment rod.

8. The apparatus as recited in claim 1, and further comprising a hinged cover for selectively covering and uncovering the at least partially open top of the fluid evaporator, and means spacing at least part of the cover from the fluid evaporator top when the cover is closed to facilitate ambient air and vapor flow through the vapor exhaust means.

9. The apparatus as recited in claim 1, and further comprising means for accessing the space between the fluid evaporator and flue chamber to clean the outer surfaces of the side and back walls of the fluid evaporator and the inner surfaces of the side walls of the flue chamber.

10. The apparatus as recited in claim 1 wherein the means for directing the heated air comprises substantially equally spaced bars mounted below the fluid evaporator and extend into the space between the fluid evaporator and the flue chamber to reduce turbulence of the heated air as it passes between the flue chamber and the fluid evaporator.

11. Apparatus for treating wastewater according to claim 1, wherein the burner means uses diesel oil and kerosene, the pump means is self-priming, and further comprising a base to support the fire box, fluid evaporator and flue chamber, and means for detachably mounting the pump means to the base support to permit removal of the pump means from the base support for transportation and inventory.

12. Apparatus for treating wastewater according to claim 1, wherein the pump means, burner means, vapor exhaust means and contaminant collecting means are electrically operated, and further comprising an electrical circuit to provide electrical power and a switch box accessible to an operator and containing electrical switches to independently activate the electrical circuit to each such means.

13. A compact, self-contained, transportable apparatus for treating wastewater containing a substantial volume of water and substantially lesser amounts of, at water boiling points, non-volatile contaminants, the apparatus comprising:

(a) a fluid evaporator to collect wastewater and having a bottom, at least a partially open top, a front wall, at least two side walls and a back wall, (b) a base support for the fluid evaporator and pump means attached to the base support for delivering wastewater to the fluid evaporator, (c) a fire box with at least a bottom, side walls and an open top, forming an interior heating space accessible to outside air for heating and positioned directly under the fluid evaporator, (d) a flue chamber surrounding at least the front, side and back walls of the fluid evaporator and spaced from the walls of the fluid evaporator to form a heated air receiving space between the flue chamber and the fluid evaporator and entirely outside the fluid evaporator, the flue chamber having a bottom open to the open top of the fire box, (e) an outer jacket surrounding at least the flue chamber and the fire box, (f) burner means for directing a flame to the interior of the fire box to heat the air in the fire box, (g) means for directing the heated air from the fire box interior through substantially the entire space between the flue chamber and the fluid evaporator walls and substantially entirely outside the fluid evaporator, the burner means providing sufficient heated air to heat the bottom and all walls of the fluid evaporator at substantially the entire height of the fluid evaporator walls, to cause the water to form water vapor, vapor exhaust means for expelling the water vapor from the fluid evaporator, duct means for causing the heated air to escape the flue chamber substantially entirely separate from the expelling water vapor, (j) collection means for withdrawing the contaminants and unevaporated water from the fluid evaporator, and (k) means for detachably mounting the flue chamber and fluid evaporator to the fire box for removal and ready access to the fire box for cleaning and maintenance.

14. Apparatus for treating wastewater according to claim 13, further comprising fire brick placed in the interior of the fire box along the walls and the bottom of the fire box, and wherein the open bottom side of the flue chamber comprises inside edges which are turned inward at all four walls to overlap the top edges of the fire box, and are further turned inside the fire box interior to retain the fire brick against the fire box walls.

15. Apparatus for treating wastewater according to claim 13, further comprising substantially equally spaced heat flow directing bars mounted to the bottom of the fluid evaporator and substantially under the full width of the flue chamber, the bars both supporting the fluid evaporator and improving even heat transfer to the fluid evaporator by reducing turbulence of the heated air as it escapes from the fire box to the space between the flue chamber and the fluid evaporator.

16. Apparatus for treating wastewater according to claim 13, wherein the base support comprises at least two U-channels both to support the entire apparatus and to receive a fork lift for transporting the apparatus.

17. Apparatus for treating wastewater according to claim 13, and further comprising fluid level control means with both lower and upper operating limits respectively for activating and deactivating the pump means at predetermined low and high wastewater levels to maintain the level substantially near the top of the fluid evaporator for more efficient use of the heated air in the space between the flue chamber and the fluid evaporator.

18. Apparatus for treating wastewater according to claim 17, and further comprising a second fluid level control means positioned at substantially near the bottom of the fluid evaporator for deactivating the burner means, the pump means, the vapor exhaust means and the contaminant collecting means, if there is insufficient wastewater to continue safe operation of the apparatus.

19. Apparatus for treating wastewater according to claim 13, and further comprising a hinged cover at the top of the fluid evaporator, and means for spacing the cover from the fluid evaporator top when the cover is closed to facilitate flow of the generated water vapor through the vapor exhaust means.

20. Apparatus for treating wastewater according to claim 13, and further comprising a discharge pipe open to the fluid evaporator for removal of unevaporated fluids and other contaminants remaining after operation, and a gate valve on the discharge pipe outside the outer jacket to control the removal.

21. Apparatus for treating wastewater according to claim 13, and further comprising memos for accessing the spaces between the fluid evaporator and the flue chamber for occasional routine cleaning of the fluid evaporator and flue chamber walls.

22. Apparatus for treating wastewater according to claim 13, wherein the pump means, burner means, vapor exhaust means and contaminant collecting means are electrically operated, and further comprising an electrical circuit to provide electrical power and a switch box accessible to an operator and containing electrical switches to independently activate the electrical circuit to each such means.

23. Apparatus for treating wastewater according to claim 22, wherein the wastewater is delivered to the fluid evaporator from an exterior source, and further comprising additional switch means to deactivate the pump means when the wastewater in the external source substantially is exhausted.

24. Apparatus for treating wastewater according to claim 22, and further comprising a thermally activated switch mounted against a fluid evaporator wall and electrically connected in series with the vapor exhaust means to delay activating the circuit to the vapor exhaust means until the temperature of the evaporator wall substantially reaches the boiling point of water.

25. The apparatus as recited in claim 13, wherein the means for detachably mounting the flue chamber and fluid evaporator comprises at least one alignment rod mounted on one of the flue chamber and fire box and means defining a hole in the other of the flue chamber and fire box to detachably receive the alignment rod.

* * * * *